United States Patent
Lin

(10) Patent No.: US 6,709,150 B2
(45) Date of Patent: Mar. 23, 2004

(54) JUICE BLENDER

(76) Inventor: Kuan-Chih Lin, No. 124, Sec. 2, Mintsu Rd., Tainan (TW)

( * ) Notice: Subject to any disclaimer, the term of this patent is extended or adjusted under 35 U.S.C. 154(b) by 92 days.

(21) Appl. No.: 10/147,813

(22) Filed: May 20, 2002

(65) Prior Publication Data

US 2003/0214877 A1 Nov. 20, 2003

(51) Int. Cl.$^7$ .......................... A47J 43/046; B02C 8/16; B01F 7/16
(52) U.S. Cl. .................. 366/199; 366/205; 366/314; 241/292; 241/199.12
(58) Field of Search ................... 366/199, 314, 366/205; 241/199.12, 292; 74/573 R

(56) References Cited

U.S. PATENT DOCUMENTS

| | | | | |
|---|---|---|---|---|
| 2,585,255 A | * | 2/1952 | Kochner et al. ............ | 366/205 |
| 2,750,162 A | * | 6/1956 | Kircher ..................... | 366/205 |
| 3,603,364 A | * | 9/1971 | Samuelian et al. ..... | 241/199.12 |
| 4,294,415 A | * | 10/1981 | Wetter et al. ............... | 241/292 |
| 4,696,434 A | * | 9/1987 | Vomhof et al. .......... | 241/282.2 |
| 4,966,332 A | * | 10/1990 | Laska ......................... | 241/292 |
| 5,655,834 A | * | 8/1997 | Dickson ..................... | 366/205 |
| 6,092,922 A | * | 7/2000 | Kett et al. .................. | 366/205 |

* cited by examiner

Primary Examiner—Tony G. Soohoo
(74) Attorney, Agent, or Firm—Rosenberg, Klein & Lee

(57) ABSTRACT

A juice blender includes a container having a horizontal partition formed with a skirt, a hat positioned in the skirt of the container, and a bearing fitted in the hat. A rotor is housed in the container and provided with a pair of spaced, diametrically-opposite blades. The rotor is formed with a shaft extending downward and rotatably supported in the bearing. An upper gasket is received in the hat and mounted around the shaft above the bearing, while a lower gasket is mounted around the shaft but below the bearing. In addition, a coupler is coaxially attached to a distal end of the shaft. The rotor and the coupler are so configured to accommodate respective weights for dynamically balancing the inertial moment produced from the spaced, diametrically-opposite blades of the rotor.

4 Claims, 3 Drawing Sheets

JUICE BLENDER

BACKGROUND OF THE INVENTION

1. Field of the Invention

The present invention relates to a juice blender and, more particularly, to a juice blender in which a rotor is dynamically balanced and so rotates smoothly.

2. Description of Related Art

A juice blender is an electrically-operated device for extracting juice from fruits or vegetables. Such a device includes a container to hold the juicy food, and a rotor provided with a pair of blades to cut or beat the food.

Typically, the two blades are arranged one above another in a diametrically opposite way. This arrangement of the blades facilitates the cutting or beating of the food, but brings about an inertial moment, which causes the rotor to vibrate and not to rotate smoothly. As a result, the device will soon be damaged, particularly if no food is in the container.

Therefore, it is an objective of the invention to provide a juice blender to mitigate and/or obviate the aforementioned problem.

SUMMARY OF THE INVENTION

The object of the present invention is to provide a juice blender in which a rotor is dynamically balanced and rotates smoothly.

Other objects, advantages and novel features of the invention will become more apparent from the following detailed description when taken in conjunction with the accompanying drawings.

DETAILED DESCRIPTION OF THE PREFERRED EMBODIMENT

Figure 1:
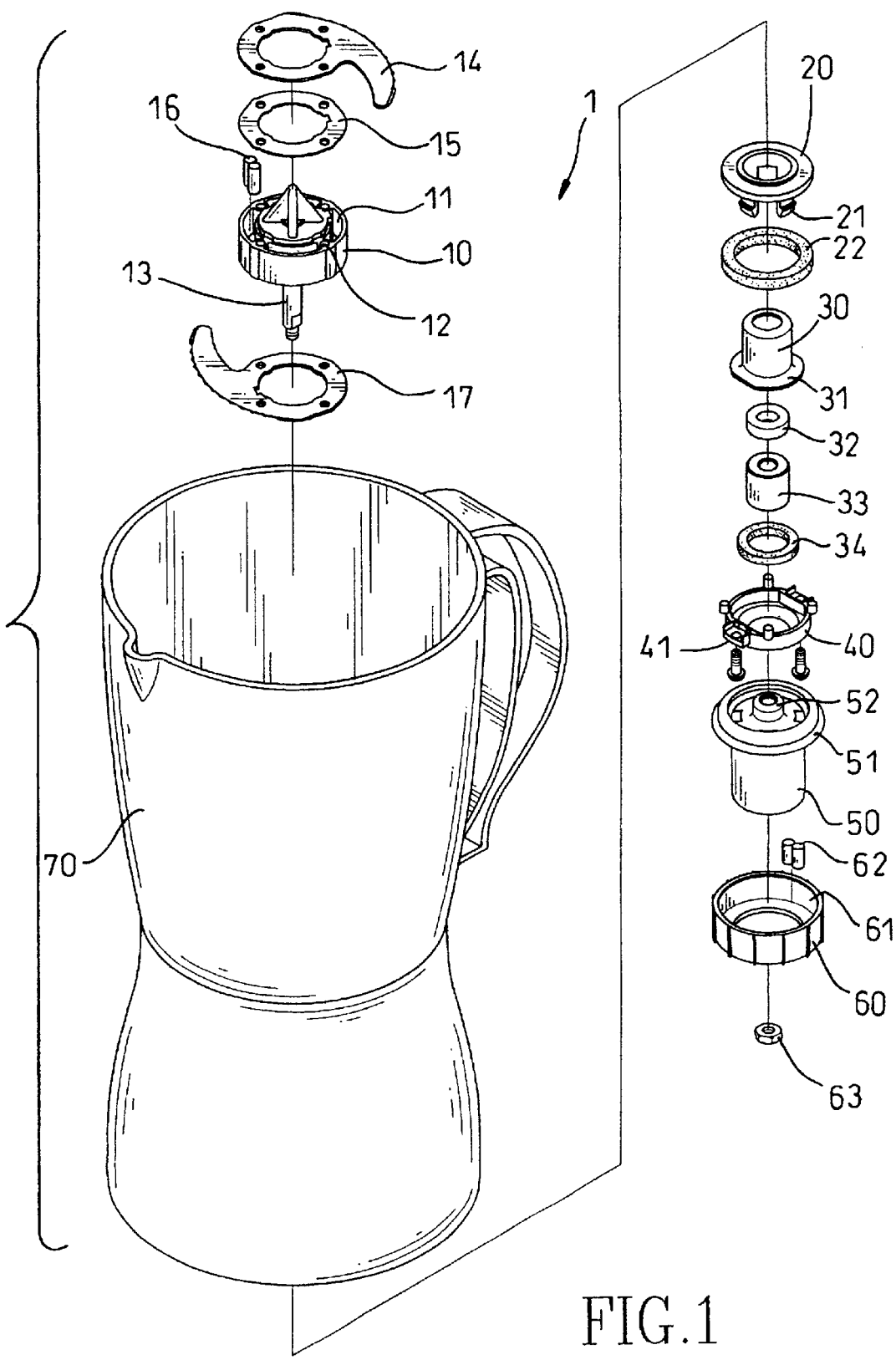
FIG. 1 is an exploded perspective view of a preferred embodiment of a juice blender in accordance with the present invention.

Referring to FIG. 1, a juice blender in accordance with the present invention includes a container (70) to hold juicy food, such as fruits or vegetables, and a blade assembly (1) housed in the container (70) to extract juice from the food.

The blade assembly (1) includes a rotor (10) provided with a pair of spaced, diametrically-opposite blades (14, 17), one above another. The two blades (14, 17) are fastened to the rotor (10), preferably by means of rivets (not shown) that extend through respective orifices (12) in the rotor (10), with a pad (15) placed between the upper blade (14) and the rotor (10).

Figure 2:
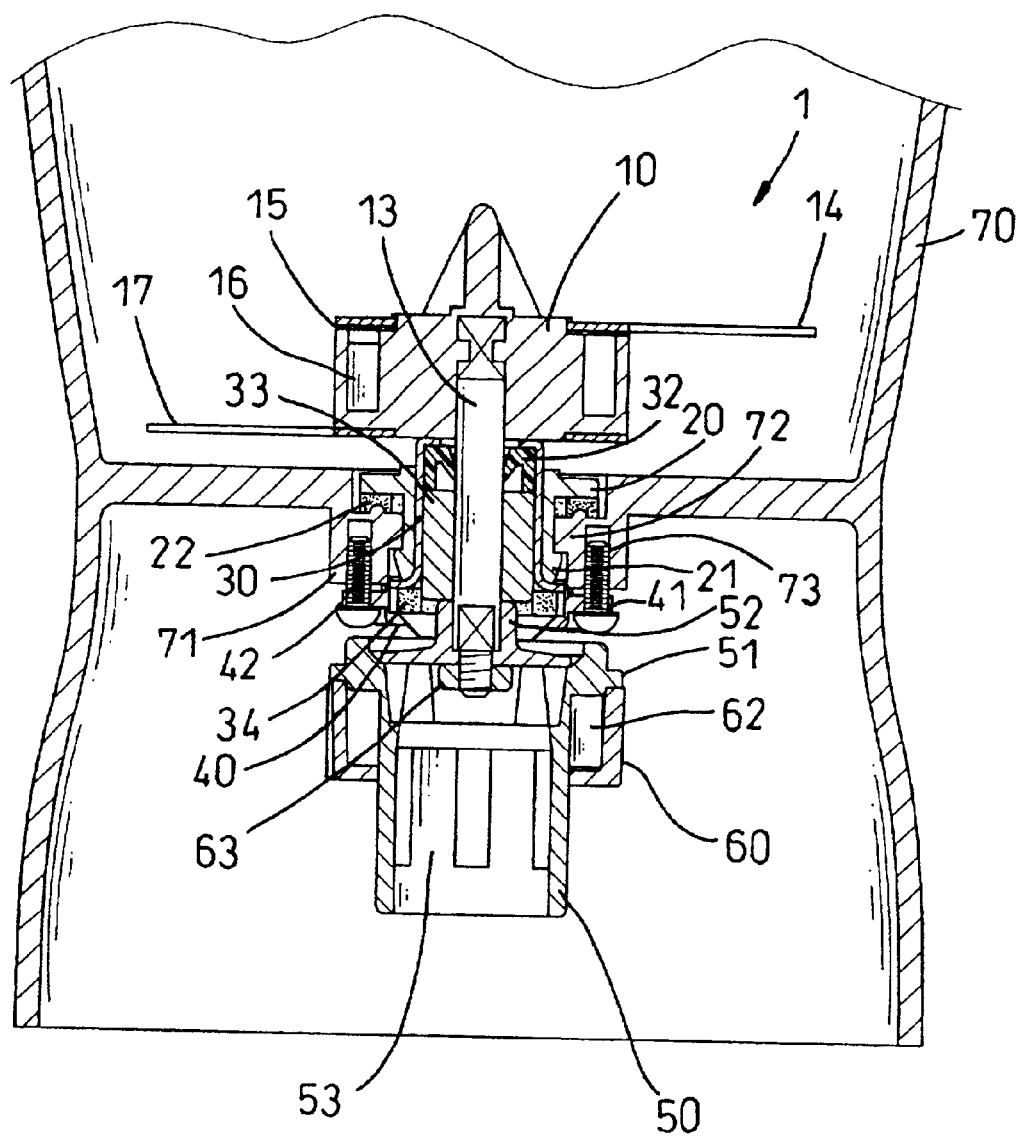
FIG. 2 is a fragmentary cross-sectional view of the juice blender shown in FIG. 1.

Referring to FIG. 2, the rotor (10) is integrally formed with a shaft (13) extending downward through a skirt (71) which is formed in a horizontal partition (not numbered) of the container (70).

The skirt (71) has an inner collar (72) formed therein, while a sleeve (20) and an O-ring (22) are accommodated in the skirt (71) with a lower flange (21) of the sleeve (20) being snapped in the skirt (71) beneath the collar (72).

In the sleeve (20) there is a hat (30) of stainless steel that has a brim (31) (see FIG. 1) engaged with an underside of the sleeve (20). The hat (30) is used for receiving and covering a bearing (33) of copper, in which the shaft (13) of the rotor (10) is rotatably supported. The hat (30) is also used for covering two gaskets (32, 34): the upper one (32), receiving in the hat (30), is mounted around the shaft (13) above the bearing (33), but the lower one (34) is mounted around the shaft (13) below the some bearing (33).

The lower gasket (34) is support in place by means of a tray (40) which has a plurality of radial tabs (41), as best shown in FIG. 1. The tray (40) is fastened to an underside of the skirt (71), preferably by a plurality of screws (42) extending through the tabs (41) and screwed into threaded holes (73) of the skirt (71).

Due to the gaskets (32, 34), juice in the container (70) will not leak downward and oil between the shaft (13) and the bearing (30) will not leak either upward or downward. Furthermore, the bearing (30), as well as the gaskets (32, 34), is additionally covered by the hat (30) of stainless steel, and so no copper oxide corrosion will occur on the bearing (30).

Referring still to FIG. 2, the rotor (10) is designed to be turned by a motor (not shown), via a hollow coupler (50) provided with an elastomer (53) therein. The coupler (50) is coaxially attached to a distal end of the shaft (13), preferably by a nut (63) that is threaded onto the shaft (13) until a top nose (52) thereof abuts the bearing (30).

It can be appreciated by those skilled in the art that when the rotor (10) is being rotated the spaced, diametrically-opposite blades (14, 17) will produce an inertial moment, which has to be dynamically balanced.

Figure 3:
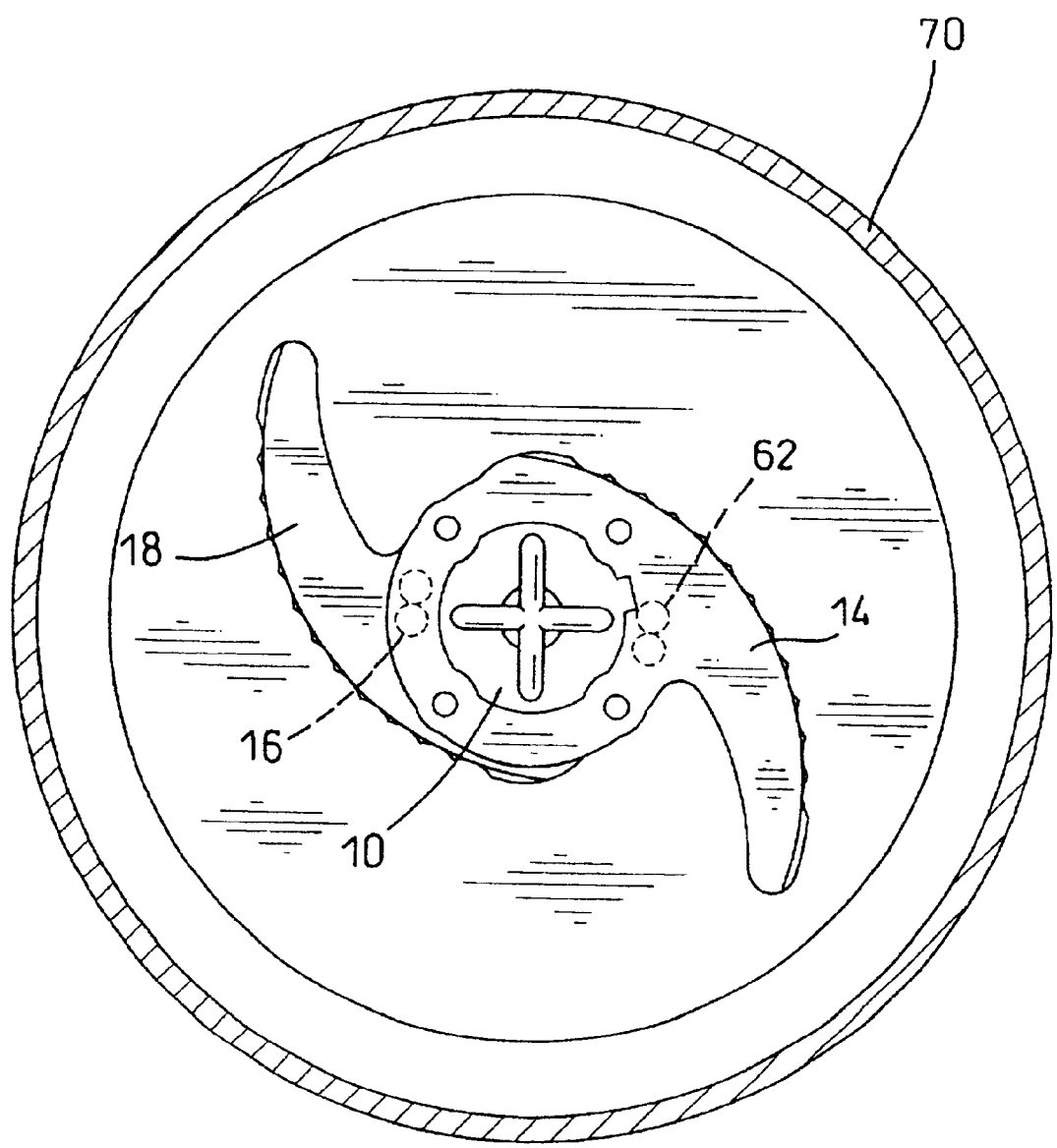
FIG. 3 is a top cross-sectional view of the juice blender shown in FIG. 1.

To this end, the inventive juice blender is provided with an upper weight (16) and a lower weight (62), in a diametrical arrangement as shown in FIG. 3. In detail, the upper weight (16) is accommodated in an annular groove (11) defined in the rotor (10) and covered with the pad (22), as clearly seen in FIG. 1, and the lower weight (62) is accommodated in an annulus (60) which is fixedly mounted around the coupler (50), such as in an adhesive manner.

As shown in FIGS. 1 and 2, the annulus (60) has a wall (61) engaged with a flange (51) of the coupler (50), thereby allowing the lower weight (62) to be placed between the wall (61) and the coupler (50) without coming out.

From the above description, it is noted that the invention has the following advantages:

1. smooth rotation of the rotor (10):

Because of the weights (16, 62), the inertial moment produced by the rotating blades (14, 17) is dynamically balanced and hence the rotor (10) may rotates smoothly.

2. no copper oxide corrosion on the bearing (30):

Because the bearing (30) as well as the gaskets (32, 34) is additionally covered by the hat (30) of stainless steel, no copper oxide corrosion will occur on the bearing (30).

3. no leakage:

Because of the gaskets (32, 34), juice in the container (70) will not leak downward and oil between the shaft (13) and the bearing (30) will not leak either upward or downward.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A juice blender comprising:

a container (70) having a horizontal partition formed with a skirt (71);

a hat (30) positioned in said skirt (71) of said container (70);

a bearing (33) fitted in said hat (30);

a rotor (10) housed in said container (70) and provided with a pair of spaced, diametrically-opposite blades (14, 17);

said rotor (10) being formed with a shaft (13) extending downward and rotatably supported in said bearing (33);

an upper gasket (32) received in said hat (30) and mounted around said shaft (13) above said bearing (33);

a lower gasket (34) mounted around said shaft (13) below said bearing (33);

a coupler (50) coaxially attached to a distal end of said shaft (13); and wherein said rotor (10) and said coupler (50) are configured to accommodate respective weights (16, 62) for dynamically balancing the inertial moment produced by said spaced, diametrically-opposite blades (14, 17) of said rotor (10) when the rotor is rotated.

2. The juice blender as claimed in claim 1 further including a tray (40) fastened to an underside of said skirt (71) to support said lower gasket (34).

3. The juice blender as claimed in claim 2, wherein said tray (40) has a plurality of radial tabs (41) adapted to be screwed to said under side of said skirt (71).

4. The juice blender as claimed in claim 1, wherein said coupler (50) is hollow in configuration and is provided with an elastomer (53) therein.

* * * * *